United States Patent [19]

Hashiguchi et al.

[11] Patent Number: 5,380,496
[45] Date of Patent: Jan. 10, 1995

[54] PROCESS AND APPARATUS FOR SUSPENSION POLYMERIZATION

[75] Inventors: Yoshiyuki Hashiguchi, Kobe; Masakiti Kishi, Himeji; Takehiko Yagyu, Kobe, all of Japan

[73] Assignee: Kanegafuchi Chemical Industry Co., Ltd., Osaka, Japan

[21] Appl. No.: 130,391

[22] Filed: Oct. 1, 1993

Related U.S. Application Data

[60] Division of Ser. No. 938,515, Sep. 2, 1992, Pat. No. 5,276,113, which is a continuation of Ser. No. 525,325, May 18, 1990, abandoned.

[30] Foreign Application Priority Data

May 22, 1989 [JP] Japan .................... 1-128083

[51] Int. Cl.$^6$ .............. C08F 2/00; B01F 13/00
[52] U.S. Cl. ................... 422/131; 422/135; 422/224; 422/230
[58] Field of Search .......... 422/131, 134, 135, 224, 422/230; 526/65, 88; 204/79

[56] References Cited

U.S. PATENT DOCUMENTS

| | | | |
|---|---|---|---|
| 3,922,255 | 11/1975 | Koestler et al. | 526/65 |
| 4,008,133 | 2/1977 | Gelbin et al. | 204/79 |
| 4,420,592 | 12/1983 | Kato et al. | 526/65 |
| 4,487,898 | 12/1984 | Kato et al. | 526/65 |

Primary Examiner—Robert J. Warden
Assistant Examiner—Christopher Y. Kim
Attorney, Agent, or Firm—Foley & Lardner

[57] ABSTRACT

There is provided an apparatus for suspension polymerization to produce polymer particles having uniform size. The apparatus has a droplet forming device with at least one orifice and a recycle line which recycles the aqueous dispersion medium through the droplet forming device, a first reactor and a second reactor. The apparatus can produce polymer particles having uniform particle size.

1 Claim, 7 Drawing Sheets

PROCESS AND APPARATUS FOR SUSPENSION POLYMERIZATION

This application is a divisional of U.S. application Ser. No. 07/938,515 filed Sep. 2, 1992, now U.S. Pat. No. 5,276,113; which is a continuation of U.S. application Ser. No. 07/525,325 filed May 18, 1990, abandoned.

BACKGROUND OF THE INVENTION

1. Field of the Invention

The present invention relates to a process and an apparatus for suspension polymerization. More particularly, it relates to a process and an apparatus for suspension polymerization which can produce polymer particles having a uniform particle size.

2. Description of the Related Art

As a process for suspension polymerization which can produce polymer particles having a uniform particle size, is known a suspension polymerization process which comprises steps of suspending a monomer liquid in an aqueous dispersion medium to form monomer liquid droplets in a column type reactor and then polymerizing the monomer without applying strong shear to the monomer liquid droplets, whereby the monomer can be polymerized with suppressing merging or splitting of the monomer liquid droplets.

For example, Japanese Patent Publication No. 36510/1978 or U.S. Pat. No. 3,922,255 discloses a suspension polymerization process in which a monomer liquid is passed through an orifice to form droplets having a rather small and uniform size in an aqueous dispersion medium. The droplets are charged in a column type reactor, and there provided with a velocity toward a bottom of the reactor by a downflow of the aqueous dispersion medium, and the monomer liquid is partially polymerized in the reactor to such extent that the droplets are not merged or split with gentle shear. Then, the partially polymerized monomer liquid droplets are discharged from the bottom of the reactor together with the aqueous dispersion medium and introduced in a solid-liquid separator which is connected with the reactor. In the separator, the partially polymerized droplets are floatation separated and concentrated by difference of densities between the droplets and the dispersion medium. The separated droplets are charged in an agitated reactor and suspension polymerized with avoiding merging or splitting to give polymer particles with a considerably uniform size.

Japanese Patent Kokai Publication No. 91701/1983 or U.S. Pat. No. 4,487,898 discloses a suspension polymerization process in which a laminar flow of a monomer liquid is gushed through an orifice in an aqueous dispersion medium to form monomer droplets having a uniform size, and the droplets are charged in a column type reactor and polymerized under a fluidized condition to such extent that specific gravity of the monomer liquid droplets becomes close to that of the aqueous medium. A slurry comprising the partially polymerized monomer liquid droplets and the dispersion medium is circulated through the tower type reactor and a settling separator, in which the partially polymerized monomer liquid droplets having specific gravity larger than that of the dispersion medium are separated and concentrated, and then charged in a second column type reactor to further continue suspension polymerization, whereby polymer particles having a considerably uniform size are continuously produced.

Characteristics of the above processes are as follows:

The monomer liquid droplets having a considerably uniform size are formed with the use of an orifice. The monomer liquid droplets having the uniform size distribution are kept in a column type reactor with forming suspension condition by a flow of an aqueous dispersion medium for a preselected period to form polymer particles having the uniform size.

Thus, selection of a suspension and protective agent is particularly important since suspension condition of droplets should be kept by only a flowing of an aqueous dispersion medium in a reactor.

Although Japanese Patent Publication No. 36510/1978 teaches that a conventional suspension and protective agent can be used, the concrete agent disclosed in examples is sodium polyacrylate or a polymer protective colloid such as an animal protein gel buffered with sodium borate in pH range of 6 to 12.

Although Japanese Patent Kokai Publication No. 91701/1983 also teaches that a generally used suspension and protective agent can be used, actually claimed one is a combination of an organic protective polymer colloid with an aqueous polymerization inhibitor, or a water-insoluble inorganic material.

Japanese Patent Kokai Publication No. 102905/1982 discloses a process for suspension polymerization in which a monomer liquid is excited under vibration when the monomer liquid is gushed in an aqueous dispersion medium to form droplets having a uniform size, and then polymerized under condition where the droplets are not merged or split. Said Publication concretely describes only that an organic polymer material or a water-insoluble inorganic material is used as the protection agents for such condition.

On suspension polymerization in the column type reactor using the above process, a suspension and protective agent mainly comprising the polymer protective colloid should be used in such an amount that the monomer liquid droplets are not substantially merged or split since the suspended condition of the droplets has to be maintained by the function of an aqueous dispersion medium which forms the downflow in the column type reactor.

However, when the polymer protective colloid is used as the suspension and protective agent, the aqueous dispersion medium which is separated from the polymer particles is discharged as a waste water from the process, and the waste water should be treated with a higher order treatment of waste water in order to avoid water pollution.

In order to avoid the above problem, a conventional suspension and protective agent mainly comprising a water-insoluble inorganic material in the form of fine powder is used instead of the polymer protective colloid. However, in a column type reactor which applies only gentle shear to the medium, the water-insoluble inorganic material constituting a main component in the aqueous suspension agent is completely adsorbed on the monomer liquid droplets, whereby a concentration of the water-insoluble inorganic material in the aqueous dispersion medium is greatly reduced. When such an aqueous dispersion medium is recycled in the reactor, the concentration of the inorganic material is too small to protect the monomer liquid droplets which are newly charged in the reactor.

SUMMARY OF THE INVENTION

It is an object of the present invention to provide a process and an apparatus for suspension polymerization which can overcome the problems as described above.

According to the present invention, there is provided a suspension polymerization process for production of polymer particles having a substantially uniform size, which process comprises steps of:

applying regular vibration to a flow of a monomer liquid which has a specific gravity smaller than that of an aqueous dispersion medium and which is gushed through an orifice having at least one pore in the aqueous dispersion medium containing a suspension agent which comprises a water-insoluble inorganic material to form monomer liquid droplets having a substantially uniform size, introducing the aqueous dispersion medium containing the droplets in a first reactor comprising a recycling means which discharges the aqueous dispersion medium from a bottom of the reactor and recycles it to a top of the reactor and a means for agitating the aqueous dispersion medium containing the droplets, in which reactor the aqueous dispersion medium and the droplets therein are kept at a preselected polymerization temperature, under an effect of agitation which controls an amount of the suspension agent and an effect of the recycling aqueous dispersion medium an amount of which allows residence of the droplets in the first reactor during polymerization in the first reactor, partially polymerizing the monomer liquid so that the specific gravity of the droplets does not exceed that of the aqueous dispersion medium while keeping the suspended condition of the droplets, discharging the partially polymerized droplets together with the aqueous dispersion medium from a lower portion of the first reactor and introducing them in a second reactor, and further polymerizing the partially polymerized droplets with sufficient agitation to mix them in the second reactor.

Further, according to the present invention, there is provided an apparatus for suspension polymerization to produce polymer particles having a uniform size, which apparatus comprises:

a droplet forming device comprising at least one orifice having at least one pore through which a monomer liquid having a specific gravity smaller than that of an aqueous dispersion medium is gushed and a means for vibrating the gushed monomer liquid through the pore, a first reactor comprising an inlet for introducing the aqueous dispersion medium containing the formed droplets in the first reactor, a means for recycling the aqueous dispersion medium from a bottom to a top of the reactor, a means for agitating the aqueous dispersion medium containing the droplets and an outlet for discharging the aqueous dispersion medium together with partially polymerized droplets, and which reactor partially polymerizes the monomer liquid droplets introduced from the droplet forming device so that the specific gravity of the dropless do not exceed that of the aqueous dispersion medium under a preselected polymerization temperature, and a second reactor comprising an inlet for introducing the partially polymerized droplets discharged from the first reactor in the second reactor and a means for mixing the droplets and the aqueous dispersion medium for further polymerization.

DETAILED DESCRIPTION OF THE INVENTION

Figure 1:
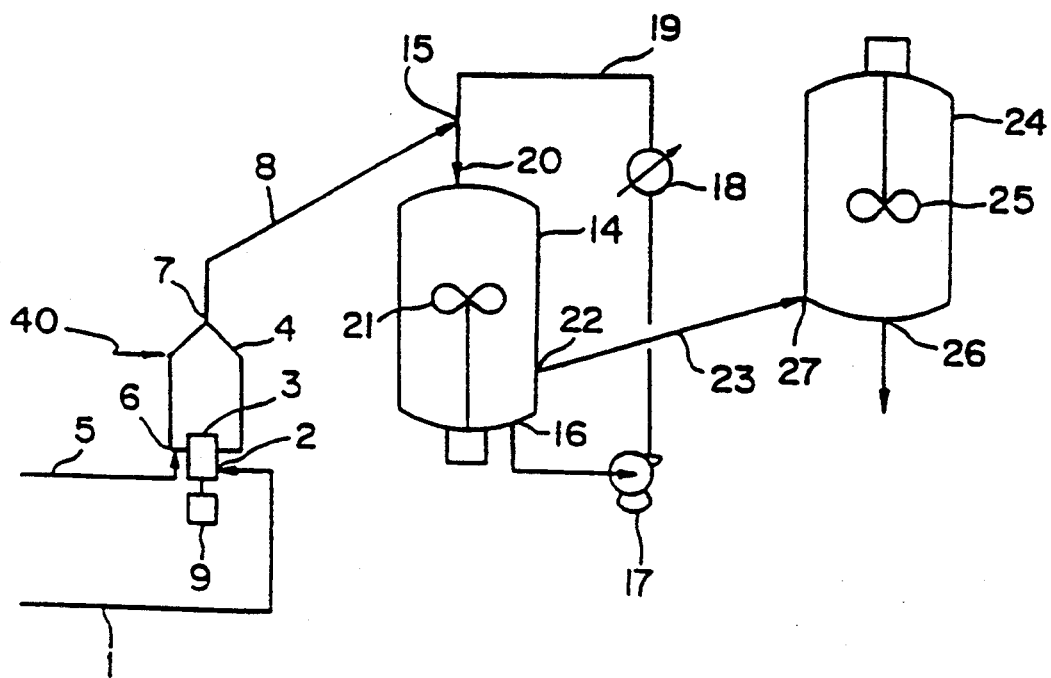
FIG. 1 shows a flow sheet of the process according to the present invention.

According to the present invention, in a suspension polymerization process wherein monomer liquid droplets are polymerized with forming, in a reactor, a fluidized portion comprising an aqueous dispersion medium and the monomer liquid droplets after forming the droplets having a substantially uniform size from a monomer liquid with a specific gravity smaller than that of the aqueous dispersion medium, the aqueous dispersion medium containing the droplets is agitated with the agitating means in the first reactor, whereby, in the first reactor, there is formed a stirred fluidized portion where suitable shear is generated between the aqueous dispersion medium and the droplets to avoid merging or splitting of the droplets. In addition, the suspension agent comprising a conventional water-insoluble inorganic material as a main component and a polymer protective agent as a supplemental component can be used to stabilize suspension condition, instead of a polymer protective colloid which requires a higher grade treatment of waste water.

Thus, as polymerization proceeds, a gentle mixing effect of the agitating means in the reactor controls an amount of the water-insoluble inorganic material which adheres to the surfaces of the monomer liquid droplets, re-suspends the water-insoluble inorganic material which has excessively adhered to the droplet surfaces in the aqueous dispersion medium, and balances the amount of the water-insoluble inorganic material on the surfaces of the droplets with that suspended in the aqueous dispersion medium. Thereby the suspension condition of the droplets under polymerization is maintained. At the same time, a concentration of the water-insoluble inorganic material in the aqueous dispersion medium which is recycled to the top of the reactor is kept at a level not less than a preselected concentration and the monomer liquid droplets newly supplied from the droplet forming device are suspended and protected by the water-insoluble inorganic material present in the aqueous dispersion medium, whereby the droplets are suspended and protected throughout a whole stirred fluidized portion in the reactor. Therefore, the problems of the prior arts are overcome and polymer particles having a more uniform size can be produced.

The term "stirred fluidized portion" used herein is intended to mean a fluidized portion in which suspended droplets are fluidized not only by buoyancy and gravity force acting on the droplets and fluidizing effect of a dispersion medium as observed in a reactor (particularly column type reactor) during suspension polymerization, but also by an agitating effect of the agitating means. The droplets fall down gradually in the reactor.

The term "partially polymerized" is intended to mean that a droplet is not necessarily polymerized to a preselected polymerization conversion in the first reactor (for example, polymerization is not completed in the first reactor). The polymerization conversion in the first reactor depends on conditions such as a kind of the monomer liquid, a particle size and a kind of the aqueous dispersion medium. However, only in the first reactor, the polymerization may be completed depending on a desired conversion. Further, the reaction which is carried out in the second reactor may be carried out in two or more steps.

The term "agitating means" is intended to mean any means as long as it provides a mild agitating effect to maintain the fluidized condition of the monomer liquid droplets and it does not cause merging or splitting of the droplets. It is preferable to use an agitator, for example, a impeller agitator in the reactor.

In the present invention, the reactor is preferably designed so that the stirred fluidized portion of the droplets can be easily kept through the effects of the aqueous dispersion medium and the agitating means. A tank type reactor is preferable.

The process and the apparatus according to the present invention are hereinafter described in detail.

The monomer liquid is supplied to the droplet forming device through a monomer liquid feeding line and passed through the orifice having at least one pore so that droplets are formed by regular vibration in the aqueous dispersion medium which is supplied through an aqueous dispersion medium feeding line.

In order to form the droplets, is used a process for regularly vibrating the monomer liquid passed through a nozzle or the orifice having at least one pore to form the droplets. On vibrating the monomer liquid, the vibration is, for example, applied to the monomer liquid directly or through the orifice. Depending on physical properties of the monomer liquid and the desired size of the droplets and the like, a size and a shape of the pore, a density of the pores, a kind, a frequency and an amplitude of the vibration and the like may be determined by a trial-and-error method.

The monomer liquid used in the present invention is not limited, and is any monomer which is generally insoluble in the aqueous dispersion medium. For example, vinyl compounds such as styrene, α-methylstyrene, divinylbenzene, acrylonitrile, acrylate and methacrylate and mixtures thereof are suspension polymerized according to the present invention.

As a polymerization initiator, any conventional compound which is used as an initiator for radical polymerization of the vinyl monomer may be used in the form of a solution in the monomer liquid. Examples of such polymerization initiator are organic peroxides (e.g. benzoyl peroxide, butyl perbenzoate, etc.) and azo compounds (e.g. azobisisobutyronitrile etc.).

According to the properties to be possessed by the polymer particle, the monomer liquid may contain a material which can be dissolved or dispersed therein.

The size of the monomer liquid droplets can be unified by adjusting the viscosity of the monomer liquid passed through the orifice by, for example, previously dissolving the polymer of said monomer in the monomer liquid. In this case, an operation range in which the uniform droplets are formed depends on a viscosity of the monomer liquid. The viscosity of the monomer liquid may be such that 20% by weight of the polymer is contained in the monomer liquid.

In the present invention, the suspension agent (or suspension and protective agent) is used to prevent merging or splitting of the droplets when the droplets having the uniform size are formed from the monomer liquid and also when the monomer liquid is polymerized in the polymerization reactor. A main component of the suspension agent is a water-insoluble inorganic material in the form of fine powder. The term "water-insoluble" is intended to mean a material which is hardly water-soluble and therefore, a material which is water-soluble a little can be used provided that it has a function of the suspension agent.

The term "main component" is intended to mean a substantial component of the suspension agent. For example, a weight percent of the water-insoluble inorganic material as the main component is more than 50%, preferably more than 60% and more preferably more than 70% by weight of the suspension agent. The suspension agent may comprise a polymer protective colloid and other suspension and protective agent as an auxiliary material. A suitable composition of the suspension agent is determined depending on a kind of the monomer liquid and conditions of the polymerization.

Examples of the water-insoluble inorganic material are calcium phosphate, calcium carbonate and magnesium pyrophosphate preferably in a fine powder form.

Examples of the polymer protective colloid are polyvinyl alcohol, methyl cellulose derivatives and polysodium acrylate.

As other suspension and protective agent, there are exemplified anionic surfactants and nonionic surfactants.

When dispersed in water, the water-insoluble inorganic material as the main component not only prevents merging of the droplets but also adheres to the surfaces of the droplets so as to promote prevention of merging of the monomer liquid. In particular, the calcium phosphate fine powder is effective, and further calcium carbonate fine powder may be used in combination with calcium phosphate fine powder.

An amount of the water-soluble inorganic material is a sum of an amount of the material which adheres to the droplets and an amount of the material which is dispersed in the aqueous medium to prevent merging of the droplets till the polymerization is finished.

When the calcium phosphate fine powder is used, a concentration thereof in the aqueous dispersion medium filled in the reactor is not less than 0.03%, preferably not less than 0.04% and more preferably not less than 0.05%, for example 0.1% by weight before the monomer liquid is supplied in the reactor.

The anionic surfactant is used when the function of the water-insoluble inorganic material have to be increased. α-Olefinsulfonate and alkyldiphenylsulfonate are exemplified. The anionic surfactant is preferably used in a concentration of 0.001 to 0.01% by weight in the aqueous dispersion medium, but the concentration depends on amounts of the water-insoluble inorganic material and the polymer protective colloid.

The polymer protective colloid is used when prevention of merging of the droplets of the monomer liquid should be assisted. An amount of the used polymer protective colloid depends on the amounts of the water-insoluble inorganic material and the anionic surfactant. For example, the polymer protective colloid is preferably used in a concentration of not less than 0.001% by weight in the aqueous dispersion medium, but the concentration should be such that the higher order treatment of waste water is not necessary.

The polymer protective colloid tends to emulsify the monomer liquid in the aqueous dispersion medium and also to foam the aqueous dispersion medium, and therefore the amount to be used has an upper limit depending on a kind of the polymer protective colloid. Generally, more than 0.05% by weight of the polymer protective colloid in the aqueous dispersion medium is not desirable.

In addition, other suspension and protective agent such as a nonionic surfactant can be used in combination.

For example, in the case of polymerization of styrene, the suspension and protective agent can be used which comprises 0.03 to 0.6% by weight of the water-insoluble inorganic material (for example, calcium phosphate), 0.003 to 0.05% by weight of the polymer protective colloid (for example, polyvinyl alcohol) and 0.001 to 0.01% by weight of other suspension agent (for example, sodium α-olefinsulfonate) in the aqueous dispersion medium.

The process and the apparatus of according to the present invention will be hereinafter described in detail with reference to the accompanying drawings.

FIG. 1 shows a flow sheet of the present suspension polymerization process.

The process according to the present invention comprises the droplet forming step, the first polymerization step and the second polymerization step. The apparatus according to the present invention comprises the droplet forming device 40, the first reactor 14 and the second reactor 24.

In the device 40 for forming the droplets, a known device can be used in which the monomer liquid is gushed through the orifice 3 having at least one pore in the aqueous dispersion medium to form the droplets at a tip portion of a liquid column of the monomer liquid. For example, the monomer liquid is gushed through the orifice having at least one pore in the aqueous dispersion medium in the form of the liquid column under a laminar condition and then considerably uniform droplets are formed, while the aqueous dispersion medium is supplied in parallel to the gushed monomer liquid column without disturbing the formation of the uniform droplets.

However, preferably used is a droplet forming device which has such a mechanism that the monomer liquid is subjected to the regular vibration when it passes through the orifice having at least one pore to form the uniform droplets. Reasons why such device is preferably used are as follows:

In a process in which a monomer liquid is gushed through an orifice (or nozzle) having at least one pore into an aqueous dispersion medium to form uniform droplets, when the gushed liquid is under a laminar condition, a size distribution of the formed droplets is relatively sharp in comparison with the case where the gushed liquid is under out of the laminar condition. However, it is the practically recognized fact that the distribution is considerably broad because of irregular vibration of the gushed flow and turbulence due to friction between the gushed flow and the aqueous dispersion medium. Such fact has been well-known from, for example, "Chemical Engineering Handbook", p. 789, FIG. 10.8, Maruzen (1978) and Fujinawa, Maruyama and Nakaike: Chemical Engineering, 21 (4), 194-200 (1957).

In a process in which a suspension polymerization is carried out while a fluidized portion is formed, monomer droplets form the fluidized portion in a reactor by balancing buoyancy and gravity force acting on the droplets and resistance force against a flow of an aqueous dispersion medium, which is also adaptable in the stirred fluidized portion of the present invention. Such balancing depends on a size and a density of the droplet. The density of the droplet depends on the polymerization conversion. Therefore, the droplets are layered in the (first) reactor along a depth direction thereof so that in the upper portion of the fluidized portion, the droplets having the lower polymerization conversion are present, and in the lower portion of the reactor, the droplets having the higher polymerization conversion are present. Then, only the droplets having the higher polymerization conversion can be discharged from the lower portion of the reactor in turn.

However, a relation between the polymerization conversion and a position where a droplet is located is not fixed when there is a distribution in a droplet size. For example, the smaller droplets tend to be located in the upper portion of the fluidized portion and the larger droplets tend to be located in the lower portion of the fluidized portion. Then, the fixed relation between the size of the droplet and the polymerization conversion cannot be established.

When the droplet size has a fairly broad distribution as in the known case where the monomer liquid is passed through the orifice having at least one pore into the aqueous dispersion medium to form droplets at the tip portion of the liquid column, it is difficult to obtain droplets having a constant polymerization conversion from the (first) reactor. Thus, droplets which have been polymerized to a lower extent cannot help being supplied to the second reactor, and thereby droplets are split in the second reactor. Alternatively, droplets which are polymerized to a higher extent are separated together with the aqueous dispersion medium in the separating device, and they are recycled to the first reactor and accumulated there. Therefore, the process in which the monomer liquid is only passed through the orifice having at least one pore to form the droplets at the tip portion of the monomer liquid column is not preferred.

To the contrary, in the droplet forming apparatus in which the liquid column of the monomer is subjected to the regular vibration to form the droplets when the monomer liquid is gushed through the orifice having at least one pore, the droplets having the uniform distribution can be formed, which is described in Yoshida and Nagai, "Study on Production of Uniform-sized Droplets by Mechanical Vibration": Transactions of The Japan Society of Mechanical Engineers, 44 (401), p. 171-177 (1972). The reference describes as follows:

When the regular vibration with an amplitude larger than that of irregular vibration of a gushed flow and turbulence due to the friction between the gushed flow and an aqueous dispersion medium is applied, a surface wave which corresponds to the frequency of the regular vibration is generated when the regular vibration is transferred to a surface of the liquid column ,which is gushed through an orifice. The surface wave is amplified to generate, from a tip portion of the liquid column, droplets having a uniform size calculated according to the following equation:

$$Dp = (3Un.Dn^2/2f)^{\frac{1}{3}}$$

wherein Dp is a diameter of the droplet (mm), Un is a velocity of the gushed flow (m/sec.), Dn is a diameter of the pore (mm) and f is a frequency of the vibration to be applied (1/sec.). Thus, stable polymerization can be carried out when the above conditions can be kept stable.

In a preferred embodiment of the present invention, the droplet forming device 40 comprises an orifice plate 3 having at least one pore, a vibration mechanism 9 and a column 4 having an inlet 6 through which the aqueous dispersion medium is introduced and an outlet 7 through which the aqueous dispersion medium containing the droplets of the monomer liquid is discharged. The orifice plate 3 is located in the column. The vibration mechanism 9 provides the vibration so that the liquid monomer column through the orifice plate 3 in the aqueous medium is regularly vibrated to form the droplets having the uniform size.

A size of the droplet can be beforehand calculated according to the above equation and operation conditions under which the droplets are formed can be determined by estimating them from the above reference such as "Study on Production of Uniform-Sized Droplets by Mechanical Vibration" and, for example, Japanese Patent Publication No. 8296/1956 and modifying them by a trial-and-error method.

However, the operating conditions are very important, and those of only the gushed velocity of the monomer liquid and the frequency of the vibration are not sufficient. For example, conditions described in Japanese Patent Kokai Publication No. 120905/1982 or U.S. Pat. No. 4,444,961, that is, a flow characteristics range of the gushed monomer liquid from the orifice (Reynolds number) and a frequency characteristics range (Strouhal number), are not sufficient. Such conditions contain a wide condition range in which no uniform droplets can be formed.

According to the present invention, a graph containing an amplitude of the vibration as a variable is obtained by a trial-and-error method on a diameter of the orifice pore and the frequency, which graph shows a region where substantially uniform droplets can be formed. Thus, the graph contains not only the flow characteristics of the monomer liquid gushed through the orifice into the aqueous dispersion medium and the frequency characteristics of the vibration but also amplitude characteristic of the vibration.

Figure 2:
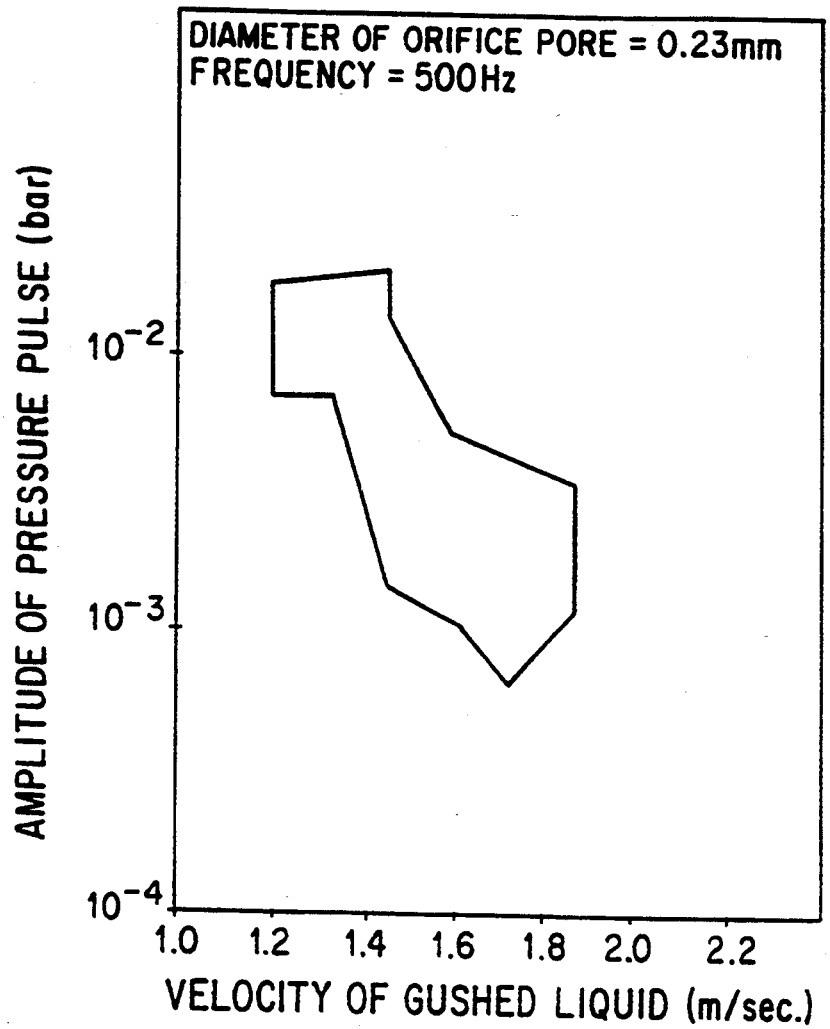
FIG. 2 is a graph showing a suitable droplet forming condition.

FIG. 2 shows an example of the graph which indicates the uniform droplet forming region in the case where the vibration is provided with a pressure pulse which is described below. Under the conditions of the amplitude of the pressure pulse and the gushed velocity which are within the polygon in FIG. 2, the uniform droplets are formed.

As previously described, as a mechanism which vibrates the gushed monomer liquid in order to form the droplets, there are exemplified two embodiments. In one embodiment, the vibration of a vibrator is transferred to the orifice plate (see FIG. 3). In the other embodiment, the vibration of the vibrator is transferred to the monomer liquid (see FIG. 4) to generate a pressure pulse. These two mechanisms will be explained in detail below.

Figure 3:
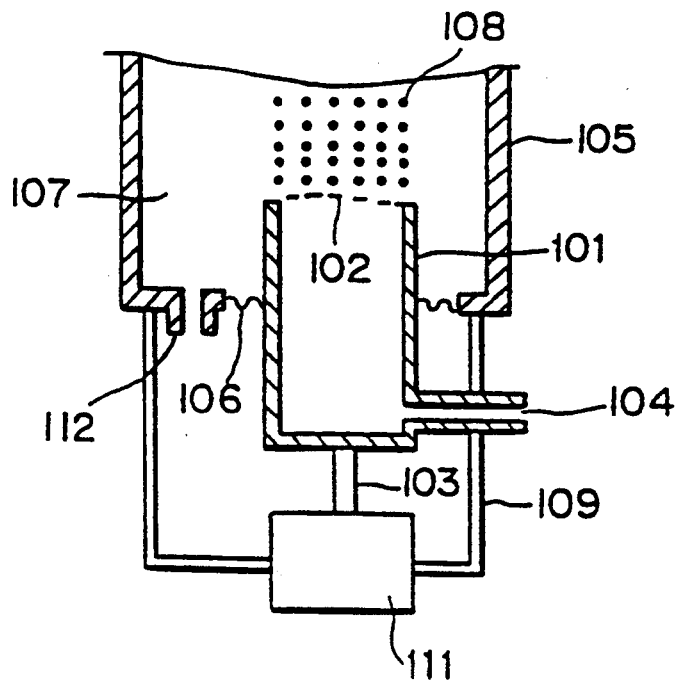
FIGS. 3 and 4 schematically show sectional views of two embodiments of the droplet forming device.

FIG. 3 schematically shows a sectional view of a portion near the orifice plate of the droplet forming device which is used in the present process, wherein the vibration of the vibrator is transferred to the orifice plate.

In FIG. 3, a top portion of an orifice box 101 has the orifice plate 102 having at least one pore. A bottom portion is connected with a vibrating member 103 of the vibrator 111 to regularly vibrate the gushed liquid column. The orifice box comprises an inlet portion 104 for introducing the monomer liquid into the orifice box. In order to keep the formed droplets stable, the droplets are contacted with the aqueous dispersion medium containing a dispersion agent in a column 105 which is connected with the orifice box 101 through a diaphragm 106 so as to be filled with the aqueous dispersion medium.

Figure 4:
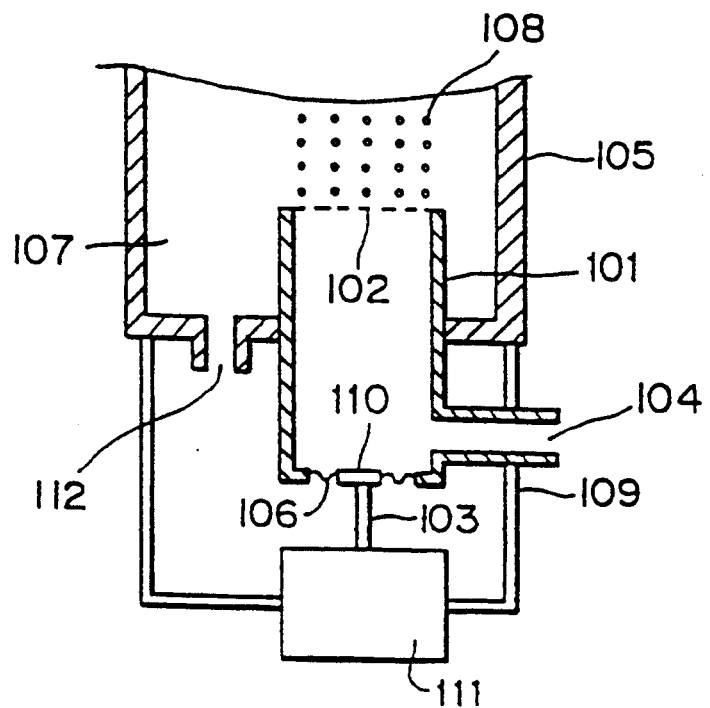

FIG. 4 schematically shows a sectional view of a portion near the orifice plate in another embodiment of the droplet forming device which can be used in the present invention. In this embodiment, the vibration of the vibrator is transferred to the monomer liquid to generate the pressure pulse.

In FIG. 4, the orifice box 101 comprises the orifice plate 102 having at least one pore as the top portion thereof to form the liquid column of the monomer in the aqueous dispersion medium 107. The bottom portion of the orifice box is connected concentrically, through a diaphragm 106, to a vibrating plate 110 fixed to the vibrating member 103 of the vibrator 111 in order to transfer the regular vibration to the liquid column formed through the orifice pore. The orifice box comprises the inlet portion 104 for introducing the monomer liquid into the orifice box 101. In order to keep the formed droplets stable, the droplets are contacted with the aqueous dispersion medium containing the dispersion agent in the column 105 which is connected with the orifice box 101 so as to be filled with the aqueous dispersion medium.

The droplet forming step and the subsequent polymerization steps will be described again with reference to FIG. 1.

The monomer liquid is supplied in the orifice box through a monomer liquid feeding line 1 and the monomer liquid inlet portion 2, and is formed into the droplets when the monomer liquid is passed through the orifice plate 3 into the column 4 which is filled with the aqueous dispersion medium.

The aqueous dispersion medium is supplied in the column 4 through an aqueous dispersion medium feeding line 5 and an inlet portion 6 for introducing the aqueous dispersion medium. The formed droplets contact with the aqueous dispersion medium in the column, and are protected and stabilized by the function of the suspension agent contained in the aqueous dispersion medium. The droplets and the aqueous dispersion medium are discharged through an outlet portion 7 and a line 8, and then supplied in the first reactor 14.

Figure 5:
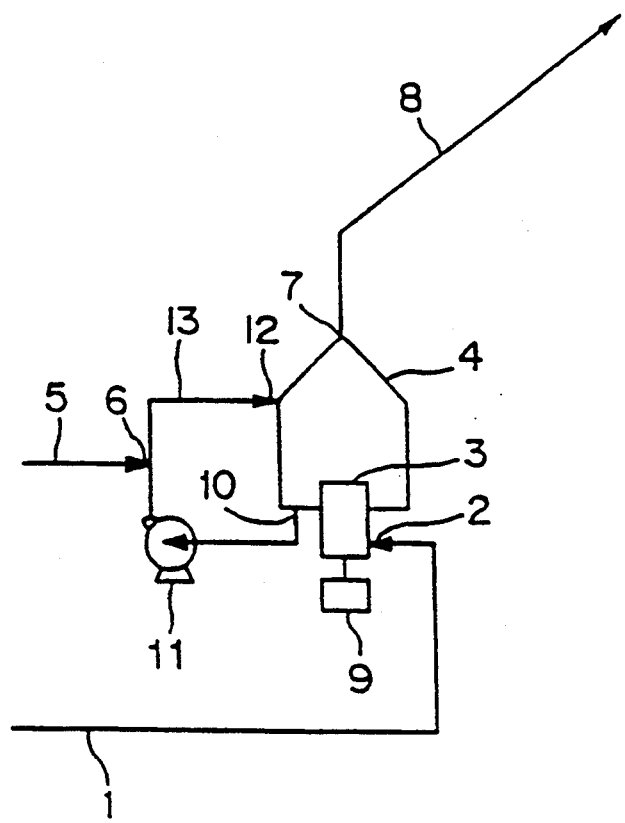
FIG. 5 shows a flow sheet of the droplet forming step.

In the case where the water-insoluble inorganic material is used as a main component of the suspension agent, a column comprising a recycling line 13 for the aqueous dispersion medium is preferably used as shown in FIG. 5 instead of the above process. In such column, the aqueous dispersion medium is discharged through an outlet portion 10 located at a bottom of the column and recycled to the column through a recycling device 11 and an inlet portion 12 to form a downflow in the column, whereby sedimentation of the suspension agent on the bottom of the column is prevented. In addition, the downflow contacts with the droplets rising through the column with buoyancy in a counter current mode to promote stability of the droplets.

Before the aqueous dispersion medium containing the monomer droplets is supplied in the first reactor or mixed with a recycling aqueous dispersion medium through the second reactor which is described below, the droplets are kept at a temperature at which polymerization is not initiated. For example, in the case where styrene is a main component of the monomer liquid, the aqueous dispersion medium and the monomer droplets are preferably kept at a temperature not higher than 40° C.

This is because when the temperature of the monomer liquid is not lower than a temperature at which the polymerization is initiated, polymerization is partially initiated in the droplet forming device to cause adverse effects as follows:

The orifice pore is blocked with a polymerized material;

The size of the droplets is changed because a viscosity of the partially polymerized monomer liquid is increased;

An amount of adsorbed suspension agent is decreased, and

The protective effect of the water-insoluble inorganic material is reduced due to agglomeration thereof.

A slurry consisting of the droplets formed in the droplet forming device 40 and the aqueous dispersion medium is supplied in the first reactor 14 which is of stirred tank type and has an inlet portion 15 located in an upper portion thereof for receiving the slurry. An amount ratio between the monomer liquid and the aqueous dispersion medium is selected so that no accumulation of the droplets occurs in an upper potion of the droplet forming device. The ratio is determined according to the diameter of the droplet. For example, when the diameter is 1 mm, the ratio of a flow rate of the aqueous dispersion medium to a flow rate of the monomer liquid is not less than 0.7. When the diameter is 0.6 mm, the ratio is not less than 1.

The inlet portion 15 for receiving the slurry may be located in a side portion of the reactor 14, or in a lower portion of the reactor. However, the inlet is preferably located in the upper portion of the reactor. In the most preferable embodiment, as shown in FIG. 1, the slurry is supplied in the recycling line through an inlet portion 15 for the slurry and introduced together with the recycling aqueous dispersion medium in the reactor 14 through the inlet portion 20 for the aqueous dispersion medium.

The reason why the above embodiment is the most preferable is as follows. In the case where the slurry inlet portion is located in the side or lower portion of the reactor, some droplets of the partially polymerized droplets tend to flow through the line 8 from the reactor 14 back to the droplets forming device 4 when the density of said some droplets is larger than that of the aqueous dispersion medium.

In the case where a continuous polymerization is carried out in the first reactor, a downflow of the aqueous dispersion medium of a preselected flow rate is formed and a desired polymerization temperature is maintained by recycling the aqueous dispersion medium through an outlet portion 16 which is located in the lower portion, preferably near the bottom, a pumping device 17, a heating and cooling device 18, a recycle line 19 and the inlet portion 20 for the aqueous dispersion medium. In this case, the polymerization temperature is the same as the conventional suspension polymerization.

A flow rate through the recycling line 19 is determined by a superficial velocity in the first reactor 14 as described below. In order to establish a desired polymerization temperature effectively with the heating and cooling device 18 located in the recycling line 19, an amount of the aqueous dispersion medium which is recycled is preferably more than that of the aqueous dispersion medium supplied through the line 8. Generally, the amount of the recycling aqueous dispersion medium is at least ten times, for example, thirty times, as much as that of the slurry supplied through the line 8.

The pumping device 17 is used to achieve a desired recycling flow rate and usually any type of a pump can be used. Alternatively, a propeller is disposed in the recycling line to form a liquid flow.

The heating and cooling device 18 is used to keep the desired polymerization temperature and usually any type of a heat exchanger can be used. Alternatively, hot water or cool water may be directly injected in the recycling line.

In the pumping device 17 and the heating and cooling device 18, a mechanism which does not generate any pulse or vibration is preferably used from a view point of stability of droplet forming and polymerization. When the pulse or the vibration is generated, a cushion tank or an accumulator is disposed in the recycling line to damp it. Such provision of the tank or the accumulator is particularly effective when the uniform droplets are formed by the vibrating orifice.

Order of the pumping device 17 and the heating and cooling device 18 may be reversed.

Dissolved air in the aqueous dispersion medium and the monomer liquid may appear as bubbles in the reactor because of reduction of solubility of air in the medium or the monomer liquid since the temperature thereof is raised to the polymerization temperature or the monomer is polymerized. Such bubbles are not preferred from a view point of the stable polymerization. In order to prevent the generation of the bubbles, the aqueous dispersion medium and the monomer liquid are previously deaerated to remove the dissolved air.

Alternatively, the solubility of air is increased by increasing an operation pressure in the polymerization reactor to prevent the generation of the bubbles. In this case, the operation pressure in the reactor can be selected depending on other polymerization conditions, and the pressure is generally not less than 2 $Kg/cm^2$-G. For example, the pressure not less than 2 $Kg/cm^2$-G is particularly preferred for suspension polymerization of styrene. When the bubble generation is expected, a head tank may be located on the recycling line 19 above the first reactor 14 so that the bubbles can rise through the inlet portion 20 for the aqueous dispersion medium and leave a polymerization system.

Fall of the droplets is prevented by controlling a falling velocity of the aqueous dispersion medium in a region where the polymerization substantially proceeds so that the velocity is smaller than a rising velocity of the droplets due to difference between the buoyancy and the gravity force acting on the droplets, and rise of the droplets is prevented by controlling a falling velocity of the aqueous dispersion medium at the inlet portion from the droplet forming device so that the velocity is larger than the rising velocity of the droplets. Thus, the droplets are accumulated in the first reactor to form the stirred fluidized portion consisting of the monomer droplets and the aqueous dispersion medium with a mild flow resulted from the buoyancy of the droplets, a flow effect of the aqueous dispersion medium and a stirring effect of an agitating impeller 21. The polymerization proceeds in the reactor under such stirred fluidized condition.

The linear velocity of the aqueous dispersion medium which is sufficient to form the above condition depends on the density of the monomer liquid, the diameter of the droplets, a ratio between a volume of the aqueous dispersion medium and that of the monomer liquid in the first reactor. For example, when styrene is suspension polymerized, the linear velocity of the aqueous dispersion medium in a straight portion of the reactor is preferably in the range of 0.1 to 1 cm/sec. The linear velocity of the aqueous dispersion medium at the inlet portion 20 for the aqueous dispersion medium is selected by determining a diameter of the inlet portion so that the rise of the droplets is prevented and thereby the stirred fluidized bed conditions are formed. At such flow rate of the aqueous dispersion medium, the monomer droplets are not split by shear due to the flow of the aqueous dispersion medium, and also the droplets do not flow out of the first reactor with an insufficient residence time.

The impeller 21 of the first reactor 14 is rotated so that it controls an amount of the suspension agent mainly comprising the water-insoluble inorganic material, especially the water-insoluble inorganic material, which is adsorbed on the droplets.

The water-insoluble inorganic material is adsorbed shortly after the droplets are supplied in the first reactor. Without stirring, most of the water-insoluble inorganic material which is present in the reactor is adsorbed on the droplets. As a result, a concentration of the water-insoluble inorganic material suspended in the aqueous dispersion medium leaving the outlet portion 16 is drastically reduced. Such aqueous dispersion medium is recycled through the recycling line 19 to the first reactor. Thus, even if the recycled aqueous dispersion medium is mixed with the aqueous dispersion medium which is newly supplied from the droplet forming device, the concentration of the water-insoluble inorganic material is very small after mixing, and such small concentration is not sufficient to keep the droplets stably. Therefore, the water-insoluble inorganic material which is excessively adsorbed on the droplets should be re-dispersed in the aqueous dispersion medium in the first reactor.

An agitating speed of the impeller 21 fixed to the first reactor 14 is determined with considerations on the reduction of the concentration of the water-insoluble inorganic material as described above and on the prevention of splitting of the droplets by the impeller 21. The agitating speed of the impeller (=[a diameter of the impeller (cm)]×[a rotational frequency (rps)]) is generally not more than 13 cm/sec. Further, the rotating speed is determined based on each droplet size to make the effective volume ratio of the droplets and the aqueous dispersion medium in the first reactor.

In order that the first reactor 14 can keep the stirred fluidized portion as described above, a shape of the first reactor 14 is such that a cross-sectional area perpendicular to a flowing direction of the aqueous dispersion medium of the first reactor is reduced along the direction towards the upper portion of the reactor. For example, the first reactor is in the form of a cone or comprises a plurality of columns an upper column of which has a smaller diameter than that of an adjacent lower column. In addition, the reactor may be a stirred tank type one equipped with an agitator to control the adsorption of the suspension agent on the droplets.

When the polymerization in the droplets proceeds and the polymerization conversion increases with a residence time, difference of specific gravity between the dropless and the aqueous dispersion medium becomes smaller and the desired stirred fluidized condition in most portions of the first reactor is established. In the case where merging or splitting of the droplets is prevented and a size of the droplets is uniform, the droplets in which the polymerization conversion is larger aggregate in the lower portion of the stirred fluidized portion and the newly supplied droplets aggregate in the upper potion of the reactor.

The stirred fluidized portion in the first reactor gradually gets longer during continuing to supply the droplets in the first reactor and the lower end of the fluidized portion reaches an outlet portion 22 for slurry recovery which is located in the lower portion of the first reactor.

Since the polymerization conversion of the droplet is determined from the residence time thereof in the first reactor 14, the slurry containing the droplets having a desired polymerization conversion can be taken out when the outlet portion 22 is located at a preselected position so as to make the residence time of the droplets correspond so a desired polymerization period and the polymerization is carried out during the residence time. Then, the slurry is supplied in the second reactor 24 to continue or finish the polymerization.

As described above, in the present invention, the stirred fluidized portion is formed in the first reactor by controlling the superficial velocity of the aqueous dispersion medium in the range of 0.1 to 1 cm/sec. in the straight portion of the reactor. Thus, the droplets are layered in the first reactor so that the polymerization conversion of the droplets increases as they are located in a lower position in the stirred fluidized portion. In the lower portion of the reactor, only the droplets having the higher polymerization conversion aggregate. As a result, a distribution of the polymerization conversion of the droplets discharged from the outlet portion for the slurry recovery is sharp.

Japanese Patent Publication No. 36510/1978 describes a process in which a linear velocity of an aqueous dispersion medium in a straight portion of a reactor is not controlled so that it is smaller than a rising linear velocity of droplets due to difference between buoyancy and specific gravity of the droplets, so that the droplets are provided with a substantial falling velocity by a downflow of the aqueous dispersion medium. In this process, of course, the droplets discharged from a first reactor have a broad distribution of a polymerization conversion when the droplets have a size distribution. Even in a process as described in Japanese Patent Kokai Publication No. 120905/1982, that is, a process in which a monomer liquid column through an orifice under laminar condition in an aqueous dispersion medium is excited with vibration to form uniform droplets, a convective mixing effect of the monomer liquid and the aqueous dispersion medium due to a fast flow of the aqueous dispersion medium results in a broad residence time distribution of the droplets in the reactor, whereby the droplets discharged from the reactor have a broad distribution of polymerization conversion. Thus, it is difficult to achieve a sharp distribution of the polymerization conversion.

When the size of the monomer droplets is so small that it may be entrained with the downflow of the aqueous dispersion medium from the first reactor 14, the linear velocity of the aqueous dispersion medium in the lower portion of the reactor should be smaller than that in a portion above said lower portion. For example, the linear velocity is preferably not larger than 0.3 cm/sec.

In such case where the smaller droplets tend to be entrained with the downflow, the lower portion of the first reactor 14 is constructed from a plurality of columns having such diameters that a diameter of a lower column is larger than that of an upper one just above said lower one. Alternatively, the lower portion of the first reactor is in the form of a cone such that a lower portion has a larger diameter.

The droplets which has been polymerized to a preselected polymerization conversion are discharged from the lower portion of the first reactor 14, and supplied in the second reactor 24 through a line 23. The polymerization conversion of the droplets in the slurry discharged from the first reactor 14 is generally not larger than 45%, preferably not larger than 40%.

When the polymerization conversion is larger than 45%, the specific gravity of the droplet closely approaches to that of the aqueous dispersion medium. Then, the droplet tends be entrained with the recycling aqueous dispersion medium. This requires a liquid-solid separator which is specifically designed to recover the entrained droplets. This is not desirable since the operations becomes complicated and inconvenient.

The polymerization conversion of the droplets discharged from the first reactor can be determined by a trial-and-error method depending on a kind of the monomer liquid and polymerization conditions, and is generally not less than 20%, preferably not less than 25%. When the conversion is less than 20%, the droplet tends to be split under the polymerization conditions in the second reactor 24, whereby it is difficult to perform polymerization in the second reactor.

The droplets are discharged from the first reactor through the outlet portion 22 for discharging (recovering) the slurry. The outlet portion is preferably located above the outlet portion 16 for the aqueous dispersion medium.

Figure 10:
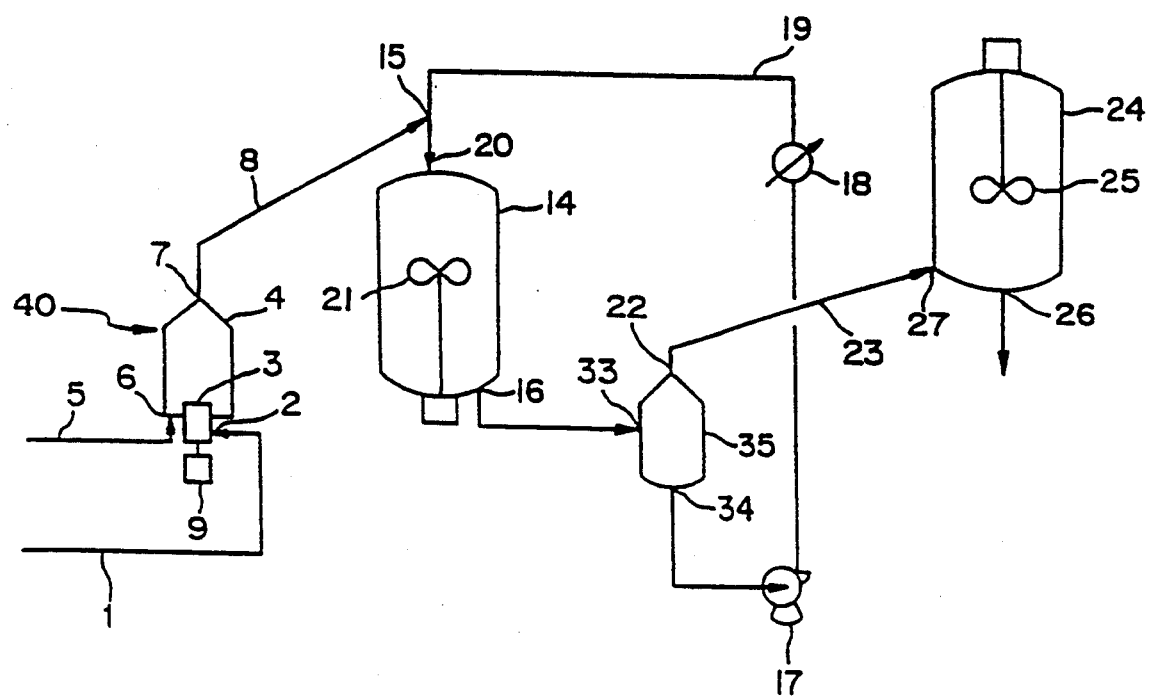
FIG. 10 shows another flow sheet of the process comprising a separator.

However, as shown in FIG. 10, a separate recovery tank 35 may be disposed between the outlet portion 16 for the aqueous dispersion medium and the recycling device 17. The tank comprises an inlet portion 33 for the aqueous dispersion medium entraining the droplets, an outlet portion 22 for recovering the slurry containing the droplets and an outlet portion 34 for the recycling aqueous dispersion medium 34. The recovering tank 35 recovers the droplets by a floatation method using density difference between the droplet and the aqueous dispersion medium. Those skilled in the art can easily design the tank an upper portion of which is in the form of a cone. The linear velocity of the aqueous dispersion medium in the tank is controlled at less than 0.3 cm/sec. so that the no droplet is entrained with the aqueous dispersion medium.

According to the present invention, the stirred fluidized portion is formed and also the distribution of the droplet size is sharp. Thus, the droplets in the first reactor are arranged so that the polymerization conversion gets higher along a direction from the upper portion towards the lower portion of the stirred fluidized portion in the reactor. In the lower portion of the reactor, only the droplets having the highest polymerization conversion aggregate. In the preferred embodiment of the present invention, the superficial velocity of the aqueous dispersion medium in the straight portion of the reactor is controlled to 0.1 to 1 cm/sec., which is smaller than the rising velocity of the droplets based on the difference between the buoyancy and the gravity force. When the outlet portion 22 for discharging the droplets is located above the outlet portion 16 for recycling the aqueous dispersion medium, a portion in which only the aqueous dispersion medium not containing and separated from the monomer liquid droplets is present is formed between the outlet portions 16 and 22. Thus, the slurry containing the droplets is separated from the aqueous dispersion medium to be recycled without a specific separator (or a recovery tank).

In a process in which the linear velocity of the aqueous dispersion medium in the straight portion of the first reactor is not controlled so that it is smaller than the rising velocity of the droplets due to the difference of the specific gravity between the droplets and the aqueous dispersion medium and the droplets are provided with a substantial falling velocity by the aqueous dispersion medium as described in Japanese Patent Publication No. 36510/1978, the droplets are always entrained out of the reactor with the aqueous dispersion medium and then the slurry cannot be separated from the recycling aqueous dispersion medium in the reactor. The process as described in said Publication requires a slurry recovering device which follows the first reactor and makes the process complicated.

The droplets supplied in the second reactor 24 through the inlet portion 27 for the slurry are mixed with an agitator 25 till a desired polymerization conversion is reached, and then recovered from an outlet portion 26 as polymer particles having a uniform size.

The agitating speed must not provide shear force to form droplets in a stirred tank reactor, and only have to keep the droplets mixed or suspended. This is a different feature from the conventional suspension polymerization.

When the polymerization conversion is not more than 60%, the droplet are relatively soft and may be split under vigorous agitation. Thus, the agitating speed of the impeller 25 in the second reactor 24 is preferably not larger than 90 cm/sec. expressed as the speed of the impeller tip portion till the polymerization conversion becomes 60%.

The second reactor 24 is a conventional reactor in the form of a stirred tank and some examples thereof will be described below.

Figure 6:
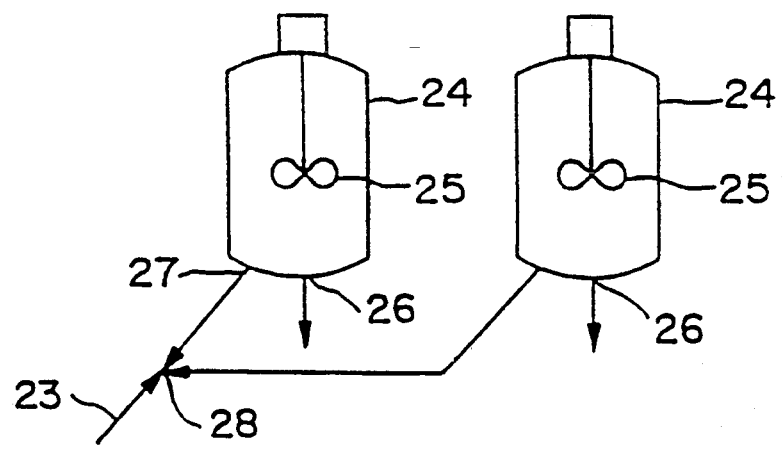
FIGS. 6 to 9 show various embodiments of the second reactor.

When the polymerization in the second reactor is batchwise carried out, at least two reactors of the stirred tank type can be used as the second reactors by using them alternatively (see FIG. 6).

Figure 7:
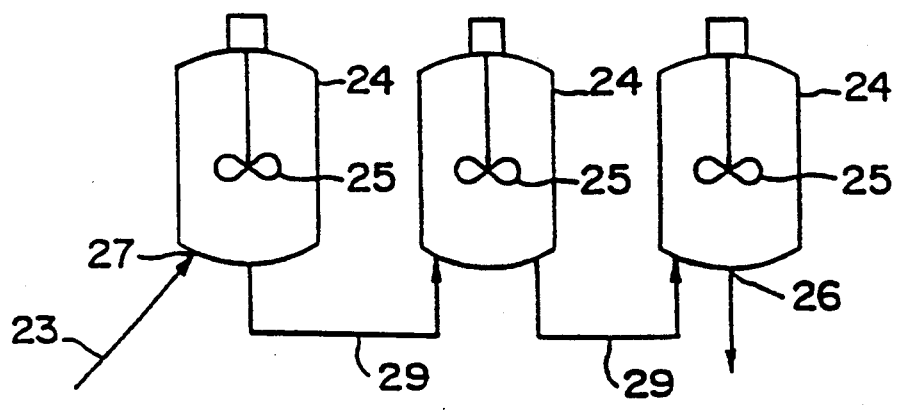

When the polymerization in the second reactor is continuously carried out, the second reactor is constructed from a plurality of reactors of the stirred take type which are adjacently connected each other so that the droplets are transferred from one reactor to the adjacent one. FIG. 7 shows a row of three reactors which are connected with lines 29.

Figure 8:
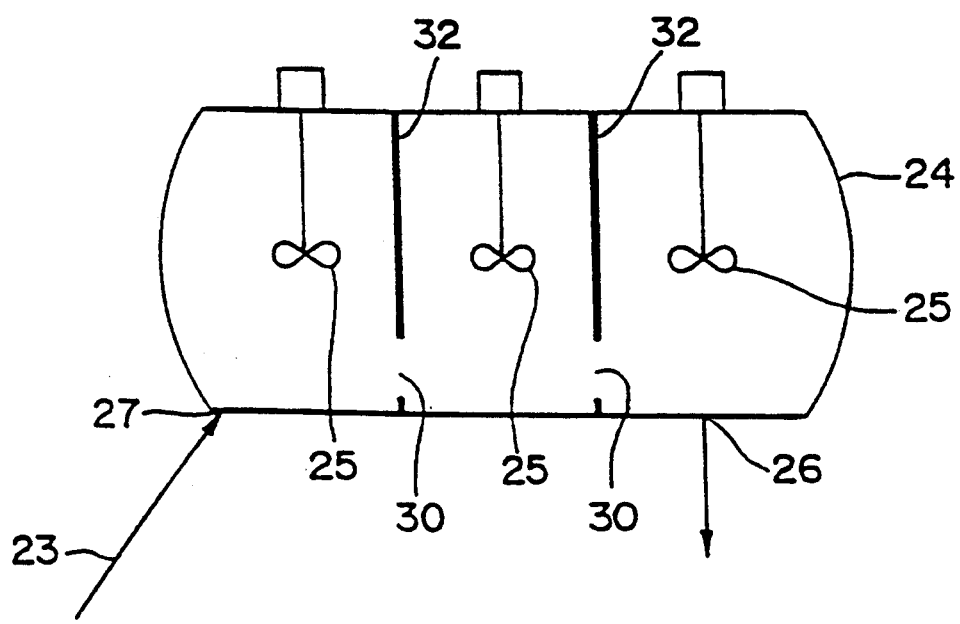

A reactor which comprises at least one partition 32 having at least one opening 30 to form a row of a stirred tank chambers can work as the connected reactors for the second reactor as described above. For example, FIG. 8 shows a stirred tank reactor comprising the three mixing chambers.

Figure 9:
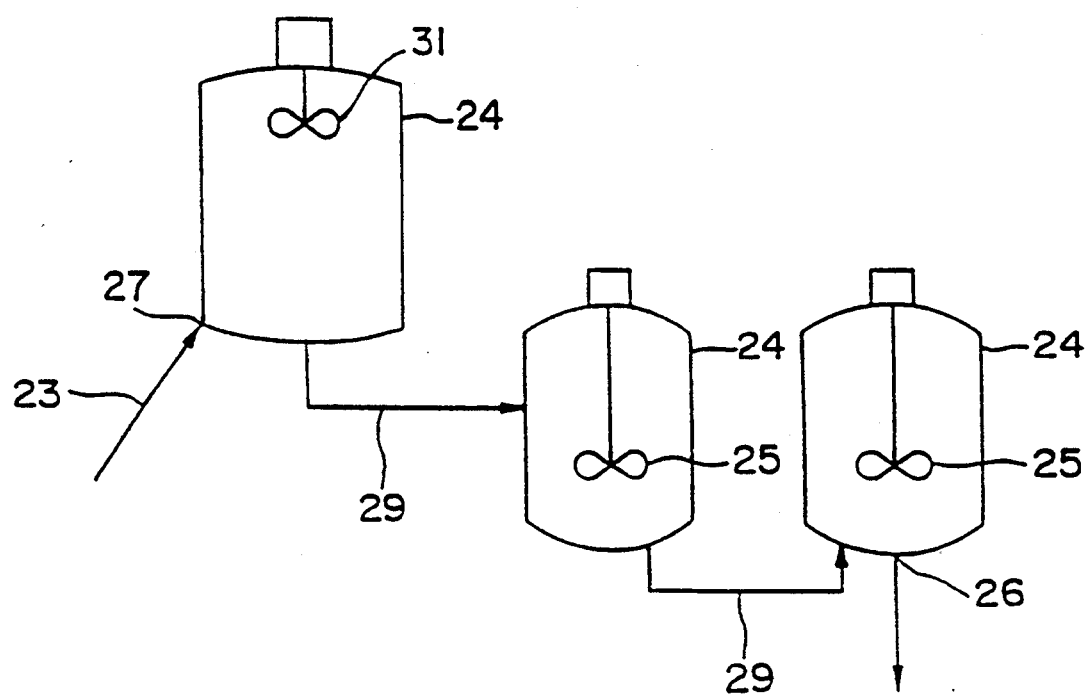

In a further embodiment, the droplets from the first reactor are polymerized in an upper portion of the second reactor which comprises an agitating means 31 in said upper portion during the specific gravity of the droplets is smaller than that of the aqueous dispersion medium. When the specific gravity of the droplets becomes equal to that of the aqueous dispersion medium, the droplets settle in a lower portion of the reactor. Then the settling droplets are entrained out of the reactor with the aqueous dispersion medium and supplied in a subsequent reactor of the stirred tank type, in which the polymerization is completed. FIG. 9 shows one embodiment in which three stirred tanks are combined to finish the polymerization.

According to the present process and apparatus, the polymerization reactors are preferably operated continuously since the droplet forming device is also operated continuously. However, the batchwise polymerization is of course possible.

The batchwise polymerization can be carried out as follows:

Is used the same apparatus as previously prepared in the case of the continuous polymerization except that the aqueous dispersion medium is at an ordinary temperature. The slurry comprising the monomer liquid droplets and the aqueous dispersion medium is supplied in a necessary amount to the first reactor. Then, the slurry kept at a desired temperature is subjected to polymerization operation in the first reactor till the specific gravity of the droplets approaches to that of the aqueous dispersion medium. Before the specific gravity of the droplets becomes equal to that of the aqueous dispersion medium and the droplets flow out of the reactor, recycle of the aqueous dispersion medium is stopped and the agitating speed of the agitating means which has agitated gently before is increased, as described above on the second reactor, to continue and finish the polymerization.

Alternatively, the droplets in the first reactor are transferred together with the aqueous dispersion medium to a second reactor where the polymerization is finished batchwise before they flow out of the first reactor.

The slurry comprising the droplets and the aqueous dispersion medium is recovered from the outlet portion 26 for recovery when the polymerization is finished. The droplets is recovered as polymer particles with a conventional dewatering process. Such particles may be further treated.

For example, a monomer liquid comprising styrene as a main component is suspension polymerized to produce polymer particles having a uniform size. Then, the particles are suspended in water, to which styrene or a monomer liquid comprising styrene as a main component is further added continuously or portion by portion to enlarge the size of the particles. As a result, the polymer particles having a larger uniform size can be produced.

In another embodiment, the styrene based particles having the uniform size produced by suspension polymerization of the present invention are suspended in water, to which a foaming agent is added to produce styrene based expandable polymer particles.

Further, the styrene based particles having the uniform size are suspended in water, to which styrene or a monomer liquid comprising styrene as a main component is supplied continuously or intermittently to further proceed the polymerization and the foaming agent is also added during or after the polymerization to produce styrene based expandable polymer beads having a larger uniform size. This process is novel.

In the process and the apparatus according to the present invention, are formed the droplets which have the uniform size and the smaller specific gravity than that of the aqueous dispersion medium;

the stirred fluidized portion is formed in the first reactor by means of the agitating effect of the agitating means and the flow effect of the aqueous dispersion medium which is recycled through the first reactor; and the water-insoluble inorganic material (or the suspension agent comprising the inorganic material as a main component) adsorbed on the droplets is controlled with the agitating effect to balance the amount of the inorganic material on the droplets and that in the aqueous dispersion medium, whereby the droplets in the stirred fluidized portion are protected under suspension condition as a whole.

Therefore, when the polymerization is carried out in the first reactor of the stirred tank type in which merging or splitting of the droplets is prevented and in the subsequent second reactor in which the agitating means agitates such that the droplets are kept stably, the conventional dispersion agent comprising the water-insoluble inorganic material as a main component can be used instead of the suspension and protective agent which requires the higher order treatment of waste water to form stably the droplets having the uniform size.

EXAMPLES

Although the present invention will be hereinafter described with reference to the following examples and comparative examples, the present invention is not limited to them.

Example 1

The droplet forming device as shown in FIG. 5 was used. Droplets containing styrene and benzoyl peroxide were formed in the aqueous dispersion medium.

The orifice box comprising the orifice plate 3 made of stainless steel having three pores was disposed in the column 4. A diameter of the pore was 0.25 mm. In order to subject the gushed liquid columns to the mechanical and regular vibration along a direction of the gushed columns through the orifice pores, the orifice box was mechanically connected with the vibrator 9. In this example, the embodiment as shown in FIG. 4 was used. The vibrator was operated at a frequency of 600 Hz to form droplets of the monomer liquid in the aqueous dispersion medium.

The droplet forming device was filled with the aqueous dispersion medium, which was discharged from the bottom 10 and recycled by a pump 11 to the upper portion 12 of the column 4 at a flow rate of 4.8 l/hr. so that a downflow of the aqueous dispersion medium was formed in the column to prevent sedimentation of the suspension agent.

The aqueous dispersion medium was supplied in the recycling line 6 through a line 5 at a flow rate of 1.6 l/hr. The aqueous dispersion medium was ion-exchanged water comprising 0.1% by weight of calcium phosphate fine powder, 0.0045% by weight of sodium α-olefinsulfonate, 0.013% by weight of polyvinyl alcohol and 0.006% by weight of sodium nitrite and was previously deaerated.

As the monomer liquid, styrene containing 0.26 parts by weight of benzoyl peroxide to 100 parts by weight of styrene was supplied to the orifice box at a flow rate of 0.8 l/hr. through a line 1 after deaeration.

In the present example, the polymerization apparatus was the same as shown in FIG. 1.

The slurry which left the droplet forming device 30 at ordinary temperature was supplied in the recycling line 19 for the aqueous dispersion medium at 15 above the first reactor 15, and then supplied in the first reactor through the inlet portion 20 for the aqueous dispersion medium.

The first reactor comprised two cylindrical portions connected with a portion in the form of a truncated cone with a height of 74 mm. One cylindrical portion had a diameter of 85 mm and a height of 700 mm and the other had a diameter of 127 mm and a height of 300 mm. The first reactor further comprised a conical portion as its top portion and a bottom of the reactor was flat. An impeller 21 with a diameter of 50 mm was inserted in the reactor from below. In this example, the agitating speed of the tip of the impeller ($=\pi \times$[diameter of impeller (cm)]$\times$[rotational frequency of impeller (rps)]) was set to 10 cm/sec.

Before the slurry containing the droplets was introduced into the first reactor, it was filled with the aqueous dispersion medium, which was recycled through the first reactor with a centrifugal pump.

The flow rate of the recycling medium was controlled so that the droplets did not flow back through the inlet 20 for the aqueous dispersion medium and the stirred fluidized portion was formed in the first reactor. In this example, the recycling amount of the aqueous dispersion medium was controlled so that a superficial velocity of the aqueous dispersion medium was 6.8 cm/sec. at the inlet portion 20 for the medium in the upper portion of the reactor, and also so that 0.44 cm/sec. in the cylindrical portion with a diameter of 85 mm. Thus, the amount of the recycling medium was 1.5 l/min., and 37.5 times as much as the slurry containing the droplets supplied from the droplet forming device.

A temperature of the recycling medium was controlled to be 90° C. with the heat exchanger 18 equipped on the recycling line 19.

When the monomer droplets were supplied continuously in the first reactor, the lower end of the fluidized portion in the reactor reached the outlet portion 22 for the droplet after 2.5 hours. During this operation, merging or splitting of the droplets was not observed. The droplets in the form of a true sphere were kept stably without being entrained with the aqueous dispersion medium to be recycled.

The droplets which reached the outlet portion 22 were discharged and supplied in the second reactor 24. The polymerization conversion of the droplets discharged from the first reactor was 36%.

The second reactor was equipped with an impeller 25 and baffle plates. The impeller was rotated at 75 cm/sec. of an agitating speed of the impeller tip. A diameter of the reactor was 140 mm and an equivalent liquid depth thereof was 250 mm.

When the second reactor was filled with the slurry comprising the aqueous dispersion medium and the droplets, the slurry supply was stopped and the polymerization was carried out at a temperature of 90° C. for three hours.

The polymerization conversion of the polymer particles from the second reactor was 92%. A size distribution of the particles is shown in Table 1.

TABLE 1

| (Size distribution of particles) | | | | |
|---|---|---|---|---|
| Diameter range (mm) | $\geq 1$ | 1–0.84 | 0.84–0.5 | $\leq 0.5$ |
| Weight fraction (%) | 0.2 | 0.3 | 99.4 | 0.1 |

(Classification with Tylar standard sieve)

Comparative Example 1

The polymerization of styrene was repeated as in Example 1 except that the monomer liquid was not subjected to the mechanical vibration in the droplet forming device.

In the first reactor, a classified fluidized condition was formed so that droplets having a larger size were present in an upper portion of the first reactor, and droplets having a smaller size in a lower portion.

The polymerization was continued at such an amount of the recycling aqueous dispersion medium that the droplets did not flow back through the inlet portion for the aqueous dispersion medium. After two hours from the start of the droplet supply in the first reactor, small droplets began to flow out of the first reactor with the aqueous dispersion medium to the second reactor. Thus, the droplets could not remain in the first reactor for a desired period. In addition, the sizes of the droplets were highly scattered.

Comparative Example 2

The polymerization of styrene was repeated as in Example 1 except that the recycling amount of the aqueous dispersion medium was 5 l/min. (therefore, a superficial velocity in the cylindrical portion with a diameter of 85 mm of the first reactor was 1.3 cm/sec.).

As a result, the superficial velocity exceeded the rising velocity determined with the density difference between the droplet and the aqueous dispersion medium. Then, vigorous mixing is occurred in top portion of the first reactor. A fraction of the droplets in the first reactor was reduced and most of the droplets flowed out of the first reactor, whereby it was impossible to keep the fluidized portion in the first reactor.

Example 2

The polymerization of styrene was repeated as in Example 1 except that the monomer liquid and the aqueous dispersion medium were not deaerated and the operating pressure in the first reactor was increased to 2 Kg/cm$^2$-G with air.

Generated was no bubble which might induce a problem in the case without the deaeration of the monomer liquid and the aqueous dispersion medium. A size distribution of obtained particles was as sharp as in Example 1.

When this example was repeated except that the operating pressure was 1 Kg/cm$^2$-G, the bubbles were generated after 2.5 hours from the initiation of the polymerization. The bubbles aggregated in the upper portion of the first reactor, whereby the polymerization proceeded unstably.

Comparative Example 3

The polymerization of styrene was repealed as in Example 1 except that the amount of the aqueous dispersion medium supplied in the droplet forming device was 15 l/hr.

In this example, the recycling amount of the aqueous dispersion medium was 1.5 l/min. and it was five times as much as the amount of the slurry containing the monomer droplets supplied in the first reactor.

The slurry was at a temperature of 30° C. Then, the temperature of the recycling medium was controlled as in Example 1, and then the temperature in the first reactor was decreased to 81° C. In order to increase the temperature in the reactor to 90° C., the following three methods were carried out.

Method 1

The slurry temperature supplied in the first reactor was increased to 81° C. by heating the aqueous dispersion medium supplied in the droplet forming device. Then, not only the formed droplets were unstably dispersed, but also polymerization of the monomer liquid was occurred near the orifice.

Method 2

The temperature of the recycling aqueous dispersion medium through the first reactor was increased. However, the bubbles were much generated when the temperature was increased to 95° C. and the fluidized portion was filled with the bubbles, which made the operation impossible.

Method 3

The operating pressure in the first reactor was increased to 2.5 Kg/cm$^2$-G so that the temperature of the recycling aqueous dispersion medium might be increased.

When the recycling medium was heated to 103° C., the temperature in the first reactor was controlled to be 90° C. and the polymerization could be possible. The slurry discharged from the first reactor and supplied in the second reactor was in a flow rate of 15.8 l/hr., since the slurry was supplied in the first reactor in a flow rate of 15.8 l/hr. (the aqueous dispersion medium in the slurry: 15 l/hr., the monomer liquid in the slurry: 0.8 l/hr.). An amount of the slurry was 6.6 times as much as that in Example 1 (2.4 l/hr.) in spite of the amount of the monomer liquid to be polymerized in a unit period was unchanged, whereby a second reactor was required to have an equivalent volume of 6.6 times as much as that in Example 1. This was uneconomical.

Comparative Example 4

The polymerization of styrene was repeated as in Example 1 except that the agitating speed of the impeller in the first reactor was set to 16 cm/sec.

Since the agitation was too vigorous, not only a volume fraction of the droplets in the reactor was decreased but also splitting of the droplets was occurred.

Comparative Example 5

The polymerization of styrene was repeated as in Example 1 except that the recycling amount of the aqueous dispersion medium through the first reactor was 1.1 l/min.

Then, a superficial velocity in the cylindrical portion with a diameter of 85 mm was 0.32 mm/sec. After three hours from the start of the monomer droplet supply in the first reactor, the end portion of the fluidized portion was reached the outlet portion for the droplets, and then the droplets were supplied in the second reactor through the outlet portion. The polymerization conversion of the droplets from the first reactor was 46% and a portion of the droplets were entrained in the recycling line.

Example 3

The polymerization of styrene was repeated as in Example 1 except that the second reactor was fully filled with the aqueous dispersion medium and a different reactor system was used as the second reactor. The reactor system comprised a reactor of the stirred tank type (diameter: 140 mm, equivalent liquid depth: 80 mm) in the upper portion of which an impeller is disposed at a position of 65 mm from the bottom and a horizontally long reactor as shown in FIG. 8. The long reactor was constituted from five chambers, adjacent two chambers of which were separated with a partition having an opening of 4 mm in diameter in the lower portion. The chamber had a horizontal cross section of a square shape having a side of 125 mm and an equivalent depth of 140 mm.

The long reactor had an agitating means in each chamber. The agitating speed of the agitator was 16 cm/sec. in the first, the second and the third chambers and 24 cm/sec. in the fourth and fifth chambers.

The polymerization was carried out continuously through the whole operation and the polymer particles were continuously obtained from the last chamber of the long reactor.

The polymerization conversion of the polymer particles was 90%. A size distribution of the particles is shown in Table 2.

TABLE 2

| (Size distribution of polymer particles) | | | | |
|---|---|---|---|---|
| Diameter range (mm) | $\geq 1$ | 1–0.84 | 0.84–0.5 | $\leq 0.5$ |
| Weight fraction (%) | 0.3 | 0.6 | 99.0 | 0.1 |

(Classification with Tylar standard sieve)

Example 4

The polymerization of styrene was carried out using the droplet forming device as shown in FIG. 5. Droplets containing styrene and benzoyl peroxide were formed in the aqueous dispersion medium.

The orifice box comprising the orifice plate 3 made of stainless steel with four pores was disposed in the column 4. A diameter of the pore was 0.17 mm. In order to subject the gushed liquid columns to the mechanical and regular vibration along a direction of the columns through the orifice pores, the orifice box was mechanically connected with the vibrator 9. In this example, the embodiment as shown in FIG. 4 was used. The vibrator was operated at a frequency of 950 Hz to form droplets of the monomer liquid in the aqueous dispersion medium.

The droplet forming device was filled with the aqueous dispersion medium, which was discharged from the bottom 10 and recycled by a pump 11 to the upper portion 12 of the column 4 at a flow rate of 4 l/hr. so that the downflow of the aqueous dispersion medium was formed in the column to prevent sedimentation of the suspension agent.

The aqueous dispersion medium was supplied in the recycling line 6 through a line 5 at a flow rate of 1.32 l/hr. The aqueous dispersion medium was ion-exchanged water comprising 0.1% by weight of calcium phosphate fine powder, 0.0045% by weight of sodium α-olefinsulfonate, 0.013% by weight of polyvinyl alcohol and 0.006% by weight of sodium nitrite and was previously deaerated.

As the monomer liquid, styrene containing 0.26 parts by weight of benzoyl peroxide to 100 parts by weight of styrene was supplied to the orifice box at a flow rate of 0.66 l/hr. through a line 1 after deaeration.

In the present example, the polymerization process was the same as shown in FIG. 1 except the second reactor.

The slurry which left the droplet forming device 30 at ordinary temperature was supplied in a recycling line 19 for the aqueous dispersion medium at 15 above the first reactor 15, and then supplied in the first reactor through the inlet 20 for the aqueous dispersion medium.

The first reactor comprised two cylindrical portions connected with a portion in the form of a truncated cone with a height of 74 mm. One cylindrical portion had a diameter of 85 mm and a height of 700 mm and the other had a diameter of 127 mm and a height of 300 mm. The first reactor further comprised a conical portion as its top portion and the bottom of the reactor was flat. An impeller 21 with a diameter of 50 mm was inserted in the reactor from below. In this example, the agitating speed of the tip of the impeller ($=\pi \times$[diameter of impeller (cm)]$\times$[rotational frequency of impeller (rps)]) was set to 12 cm/sec.

Before the slurry containing the droplets was introduced into the first reactor, it was filled with the aqueous dispersion medium, which was recycled through the first reactor with the centrifugal pump.

The flow rate of the recycling medium was controlled so that the droplets did not flow back through the inlet 20 for the aqueous dispersion medium and the stirred fluidized portion was formed in the first reactor. In this example, the recycling amount of the aqueous dispersion medium was controlled so that a superficial velocity of the aqueous dispersion medium was 6.8 cm/sec. at the inlet portion 20 for the medium in the upper portion of the reactor, and also so that 0.44 cm/sec. in the cylindrical portion with a diameter of 85 mm. Thus, the amount of the recycling medium was 1.5 l/min., and 46.9 times as much as the slurry containing the droplets supplied from the droplet forming device.

A temperature of the recycling medium was controlled to be 90° C. with the neat exchanger 18 equipped on the recycling line 19.

When the monomer droplets were supplied continuously in the first reactor, the lower end of the fluidized portion in the reactor reached the outlet portion 22 for the droplet after 2 hours and 20 minutes. During this operation, merging or splitting of the droplets was not observed. The droplets in the form of the true sphere were kept stably without being entrained with the aqueous dispersion medium to be recycled.

The droplets which reached the outlet portion 22 were discharged and supplied in the second reactor 24. The polymerization conversion of the droplets discharged from the first reactor was 35%.

The second reactor was the same horizontally long type as used in Example 3. The reactor was constituted from ten chambers, adjacent two chambers of which were separated with a partition having an opening of 4 mm in diameter in the lower portion. Each chamber had a horizontal cross section of the square shape having a side of 125 mm and an equivalent depth of 140 mm.

The long reactor had a agitating means in each chamber. The agitating speed of the agitator was 16 cm/sec. in the first, the second and the third chambers and 24 cm/sec. in the other chambers.

An average residence time in the second reactor was nine hours. The polymerization was finished at 90° C.

The polymerization conversion of the polymer particles was 95%. A size distribution of the particles is shown in Table 3.

TABLE 3

| (Size distribution of particles) | | | | |
|---|---|---|---|---|
| Diameter range (mm) | ≧0.84 | 0.84–0.59 | 0.59–0.35 | ≦0.35 |
| Weight fraction (%) | 0.3 | 0.5 | 99.1 | 0.1 |

(Classification with Tylar standard sieve)

Example 5

1300 Grams of the uniform-sized polystyrene particles (or beads) obtained in Example 1, 1550 cc of the aqueous dispersion medium comprising 0.5 parts by weight of calcium phosphate fine powder (relative to 100 parts by weight of ion-exchanged water) and 35 ppm of sodium α-olefinsulfonate (relative to 100 parts by weight of ion-exchanged water) and 1 part by weight of coconut oil (relative to 100 parts by weight of the uniform-sized polystyrene particles) were charged in an autoclave having an equivalent volume of 5 l and heated to 90° C. Then, 2 parts by weight of cyclohexane and 9 parts by weight of butane (each relative to 100 parts by weight of the uniform-sized polystyrene particles) are added to the autoclave and the mixture was heated to 110° C. in order that the beads were impregnated with butane gas. After five hours, the mixture was cooled to ordinary temperature and the beads were recovered.

The beads were matured for five days at 20° C., and then a volatilizable residue was determined to be about 6.5% The beads were heated in a steamer for three minutes and expanded polystyrene beads were obtained.

An expansion ratio was 60 and the beads had better expanded cells.

EFFECTS OF THE INVENTION

In suspension polymerization where droplets of a monomer liquid having a uniform size are formed, and the droplets are polymerized under a fluidized condition portion, a suspension agent which requires a higher order treatment of waste water has been necessarily used. However, according to the present invention, when the stirred fluidized portion is formed in a stirred tank type reactor, a conventional dispersion agent can be used which comprises an water-insoluble inorganic material as a main component to obtain polymer particles having a uniform size.

Although the present invention has been described with reference to above Examples and Comparative Examples, it is understood that the foregoing description is merely illustrative of the present invention of which many modifications may be made by those skilled in the art within the scope of the following claims without departing from the spirit thereof.

The best modes of the present inventions are exemplified as follows:

Embodiment 1

A suspension polymerization process for production of polymer particles having a substantially uniform size, which process comprises steps of:
applying regular vibration to a flow of a monomer liquid which has a specific gravity smaller than that of an aqueous dispersion medium and which is gushed through an orifice having at least one pore in the aqueous dispersion medium containing a suspension agent which comprises a water-insoluble inorganic material to form monomer liquid droplets having a substantially uniform size, introducing the aqueous dispersion medium containing the droplets in a first reactor comprising a recycling means which discharges the aqueous dispersion medium from a bottom of the first reactor and recycles it to a top of the reactor and a means for agitating the aqueous dispersion medium containing the droplets, in which reactor the aqueous dispersion medium and the droplets therein are kept at a preselected polymerization temperature, under an effect of agitation which controls an amount of the suspension agent and an effect of the recycling aqueous dispersion medium an amount of which allows residence of the droplets in the first reactor during polymerization in the first reactor, partially polymerizing the monomer liquid so that the specific gravity of the droplets does not exceed that of the aqueous dispersion medium while keeping the suspended condition of the droplets, discharging the partially polymerized droplets together with the aqueous dispersion medium from a lower portion of the first reactor above a position from which the recycling aqueous dispersion medium is discharged to recycle it to the first reactor and introducing the droplets in a second reactor comprising an agitating means, and further polymerizing the partially polymerized droplets with sufficient agitation to mix them in the second reactor.

Embodiment 2

The process according to embodiment 1, wherein the monomer liquid dissolves not more than 20% by weight of polymer of said monomer liquid.

Embodiment 3

The process according to embodiment 1 or 2, wherein the regular vibration is applied to the gushed monomer liquid by transferring the vibration from a vibrator to the orifice.

Embodiment 4

The process according to embodiment 1 or 2, wherein the regular vibration is applied to the gushed monomer liquid by transferring the vibration from a vibrator to the monomer liquid to generate a pressure pulse.

Embodiment 5

The process according to any one of embodiments 1 to 4, wherein a temperature of the aqueous dispersion medium containing the monomer liquid which is introduced into the first reactor is less than an initiation temperature of polymerization.

Embodiment 6

The process according to any one of embodiments 1 to 5, wherein a superficial velocity of the aqueous dispersion medium which recycles through the first reactor is not more than 1 cm/sec.

Embodiment 7

The process according to any one of embodiments 1 to 6, wherein a ratio of a volume of the recycling aqueous dispersion medium through the first reactor to that of the aqueous dispersion medium supplied from the droplet forming step to the first reactor is at least 10.

Embodiment 8

The process according to any one of embodiments 1 to 7, wherein a polymerization conversion of the droplets discharged from the lower portion of the first reactor is not more than 40%.

Embodiment 9

The process according to any one of embodiments 1 to 8, wherein the agitating means of the first reactor is an impeller of an agitator and an agitating speed of an impeller tip calculated from [diameter of impeller (cm)]×[rotational frequency of impeller (rps)] is not more than 13 cm/sec.

Embodiment 10

The process according to any one of embodiments 1 to 9, wherein the agitating means of the second reactor is an impeller of an agitator and an agitating speed thereof is not more than 90 cm/sec till a polymerization conversion reaches 60%.

Embodiment 11

The process according to any one of embodiments 1 to 10, wherein an operation pressure in the first reactor is not less than 2 $Kg/cm^2$-G.

Embodiment 12

The process according to any one of embodiments 1 to 11, wherein the water-insoluble inorganic material mainly comprises a calcium phosphate fine powder.

Embodiment 13

The process according to any one of embodiments 1 to 12, wherein a temperature of the recycling aqueous dispersion medium is controlled by a heating and cooling device.

Embodiment 14

The process according to any one of embodiments 1 to 13, wherein the liquid monomer mainly comprises styrene.

Embodiment 15

The process according to embodiment 14, wherein a temperature of the liquid monomer introduced in the first reactor is not more than 40° C.

Embodiment 16

A suspension polymerization process of styrene comprising
suspending the polymer particles produced by the process according to embodiment 14 or 15 to form a suspension,
adding styrene or a monomer liquid mainly comprising styrene in the suspension continuously or portion by portion to further polymerize, and
recovering styrene based polymer particles having a uniform size.

Embodiment 17

A suspension polymerization process of styrene comprising
- suspending the polymer particles produced by the process according to embodiment 14 or 15 to form a suspension,
- adding a foaming agent in the suspension during or after the polymerization, and
- recovering styrene based expandable polymer particles having a uniform size.

Embodiment 18

A suspension polymerization process of styrene comprising
- suspending the polymer particles produced by the process according to embodiment 14 or 15 to form a suspension,
- adding styrene or a monomer liquid mainly comprising styrene in the suspension continuously or portion by portion to further polymerize, and adding a foaming agent in the suspension during or after the polymerization, and
- recovering styrene based expandable polymer particles having a uniform size.

Embodiment 19

An apparatus for suspension polymerization to produce polymer particles having a uniform size, which apparatus comprises:
- a droplet forming device comprising an least one orifice having at least one pore through which a monomer liquid having a specific gravity smaller than that of an aqueous dispersion medium is gushed and a means for vibrating the gushed monomer liquid through the pore,
- a first reactor comprising an inlet for introducing the aqueous dispersion medium containing the formed droplets in the first reactor, a means for recycling the aqueous dispersion medium from a bottom to a top of the reactor, a means for agitating the aqueous dispersion medium containing the droplets and an outlet, which is located above a means from which the recycling means discharges the aqueous dispersion medium, for discharging the aqueous dispersion medium together with partially polymerized droplets, and which reactor partially polymerizes the monomer liquid droplets introduced from the droplet forming device so that the specific gravity of the droplets do not exceed that of the aqueous dispersion medium under a preselected polymerization temperature, and
- a second reactor comprising an inlet for introducing the partially polymerized droplets discharged from the first reactor in the second reactor and an a means for mixing the droplets and the aqueous dispersion medium for further polymerization.

Embodiment 20

The apparatus according to embodiment 19, wherein the regular vibration is applied to the gushed monomer liquid by transferring the vibration from a vibrator to the orifice.

Embodiment 21

The apparatus according to embodiment 19, wherein the regular vibration is applied to the gushed monomer liquid by transferring the vibration from a vibrator to the monomer liquid to generate a pressure pulse.

Embodiment 22

The apparatus according to any one of embodiments 19 to 21, wherein the droplet forming device further comprises a recycling line to form a downflow of the recycling aqueous dispersion medium in the device.

Embodiment 23

The apparatus according to embodiment 22, wherein a heat exchanger is disposed in the recycling line in order to keep the monomer liquid at a temperature at which no polymerization is initiated.

Embodiment 24

The apparatus according to any one of embodiments 19 to 23, wherein an upper portion of the first reactor is in the form of a cone and the agitating means is inserted from a bottom of the first reactor.

Embodiment 25

The apparatus according to any one of embodiments 19 to 24, wherein the second reactor comprises at least one stirred tank type reactor.

Embodiment 26

The apparatus according to embodiment 25, wherein the second reactor comprises at least one stirred tank type reactor having at least one partition with an opening to separate the reactor to form at least two chambers.

Embodiment 27

The apparatus according to. embodiment 25 or 26, wherein at least one second reactor comprises an impeller for a slow speed agitation and said reactor is of a stirred tank type such that it is filled with the aqueous dispersion medium and the monomer droplets to carry out the polymerization till the specific gravity of the droplets is equal to that of the aqueous dispersion medium.

What is claimed is:

1. An apparatus for suspension polymerization to produce polymer particles having a uniform size, which apparatus comprises:
   - a droplet forming device comprising at least one orifice having at least one pore through which a monomer liquid having a specific gravity smaller than that of an aqueous dispersion medium is passed and a means for vibrating the monomer liquid through the pore, wherein the droplet forming device further comprises a recycling line which recycles the aqueous dispersion medium through the droplet forming device to contact the aqueous dispersion medium with the droplets in a counter current mode,
   - a first reactor comprising an inlet for introducing the aqueous dispersion medium containing the formed droplets in the first reactor, a means for recycling the aqueous dispersion medium from a bottom to a top of the reactor, a means for agitating the aqueous dispersion medium containing the droplets and an outlet for discharging the aqueous dispersion medium together with partially polymerized droplets, and which reactor partially polymerizes the monomer liquid droplets introduced from the droplet forming device so that the specific gravity of the droplets do not exceed that of the aqueous dispersion medium under a preselected polymerization temperature, and a second reactor comprising an inlet for introducing the partially polymerized droplets discharged from the first reactor in the second reactor and a means for mixing the droplets and the aqueous dispersion medium for further polymerization.

* * * * *